US010826920B1

(12) United States Patent
Lin

(10) Patent No.: US 10,826,920 B1
(45) Date of Patent: Nov. 3, 2020

(54) SIGNAL DISTRIBUTION SCORE FOR BOT DETECTION

(71) Applicant: Microsoft Technology Licensing, LLC, Redmond, WA (US)

(72) Inventor: Yi-Wei Lin, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 139 days.

(21) Appl. No.: 16/204,253

(22) Filed: Nov. 29, 2018

(51) Int. Cl.
*H04L 29/06* (2006.01)
*H04L 12/26* (2006.01)

(52) U.S. Cl.
CPC .......... *H04L 63/1416* (2013.01); *H04L 43/04* (2013.01); *H04L 43/16* (2013.01); *H04L 63/1441* (2013.01); *H04L 69/22* (2013.01); *H04L 2463/144* (2013.01)

(58) Field of Classification Search
CPC ........................ H04L 63/1416; H04L 63/1441
See application file for complete search history.

(56) References Cited

U.S. PATENT DOCUMENTS

| | | | | |
|---|---|---|---|---|
| 7,895,653 | B2* | 2/2011 | Calo | G06F 21/55 726/22 |
| 9,075,990 | B1* | 7/2015 | Yang | H04L 63/105 |
| 9,420,049 | B1* | 8/2016 | Talmor | H04L 67/02 |
| 9,430,646 | B1* | 8/2016 | Mushtaq | H04L 63/1425 |
| 9,628,498 | B1* | 4/2017 | Aziz | H04L 63/1408 |
| 9,930,053 | B2* | 3/2018 | Beauchesne | H04L 63/1416 |
| 10,037,546 | B1* | 7/2018 | Benisch | G06Q 30/0248 |
| 10,270,792 | B1* | 4/2019 | Shemesh | H04L 63/1441 |
| 10,621,322 | B2* | 4/2020 | Benkreira | H04L 63/08 |
| 2014/0278610 | A1* | 9/2014 | Carnahan | G06Q 10/02 705/5 |
| 2015/0264068 | A1* | 9/2015 | Beauchesne | H04L 63/1416 726/23 |
| 2017/0034190 | A1* | 2/2017 | May | H04L 63/1408 |
| 2017/0126709 | A1* | 5/2017 | Baradaran | H04L 63/1416 |
| 2017/0126718 | A1* | 5/2017 | Baradaran | H04L 63/0281 |
| 2018/0103047 | A1* | 4/2018 | Turgeman | H04L 63/1441 |
| 2018/0332126 | A1* | 11/2018 | Metwalley | G06Q 30/02 |
| 2018/0343280 | A1* | 11/2018 | McQueen | H04L 63/08 |
| 2019/0089655 | A1* | 3/2019 | Uppala | H04L 67/16 |
| 2020/0055186 | A1* | 2/2020 | Nocon | B25J 11/0035 |

* cited by examiner

*Primary Examiner* — Ali Shayanfar
(74) *Attorney, Agent, or Firm* — Hickman Palermo Becker Bingham LLP; Christine E. Orich

(57) ABSTRACT

Technologies for detecting bot signals include extracting at least a primary signal and a secondary signal from header data logged by an automated service during a time interval, where the header data is associated with web-based client-server requests received by an online system, generating distribution data representative of the secondary signal when the primary signal matches a first criterion, converting the distribution data to a quantitative score, after the time interval, causing a web-based client-server request to be blocked or redirected when the quantitative score matches a second criterion.

17 Claims, 7 Drawing Sheets

SIGNAL DISTRIBUTION SCORE FOR BOT DETECTION

TECHNICAL FIELD

The present disclosure relates to computer network security and more particularly to technologies for detecting abusive bots and/or Internet bots performing abuse attacks, which target member-based online systems.

BACKGROUND

Web rebots, or bots, are software applications that execute automated scripts to perform tasks over the Internet on a large scale. These bots can be used for abuse attacks to massively collect important data from targeted web sites or to improperly interact with normal users on a online platform, such as by sending spam messages or online scams to the users. Because of the nature of automation, an abuse attack can cause significant damage with little or no human effort.

Guest scraping is a form of bot attack in which an automated script executes commands that connect it to a registration-based online system as a guest, without logging in as registered user. Once connected to the online system, the bot extracts information from registered users' profile pages using web scraping technology. In basic scraping attacks, bots are able to extract HTML code to collect data, but are not able to execute JavaScript like normal browsers used by humans. A JavaScript-executing bot is a more advanced bot that can execute JavaScript while scraping which makes its behavior look more like human activity.

Another type of abusive bot executes a script that creates fake user accounts in an online system, and then uses those fake accounts to obtain information from legitimate registered users of the online system.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

Figure 1A:
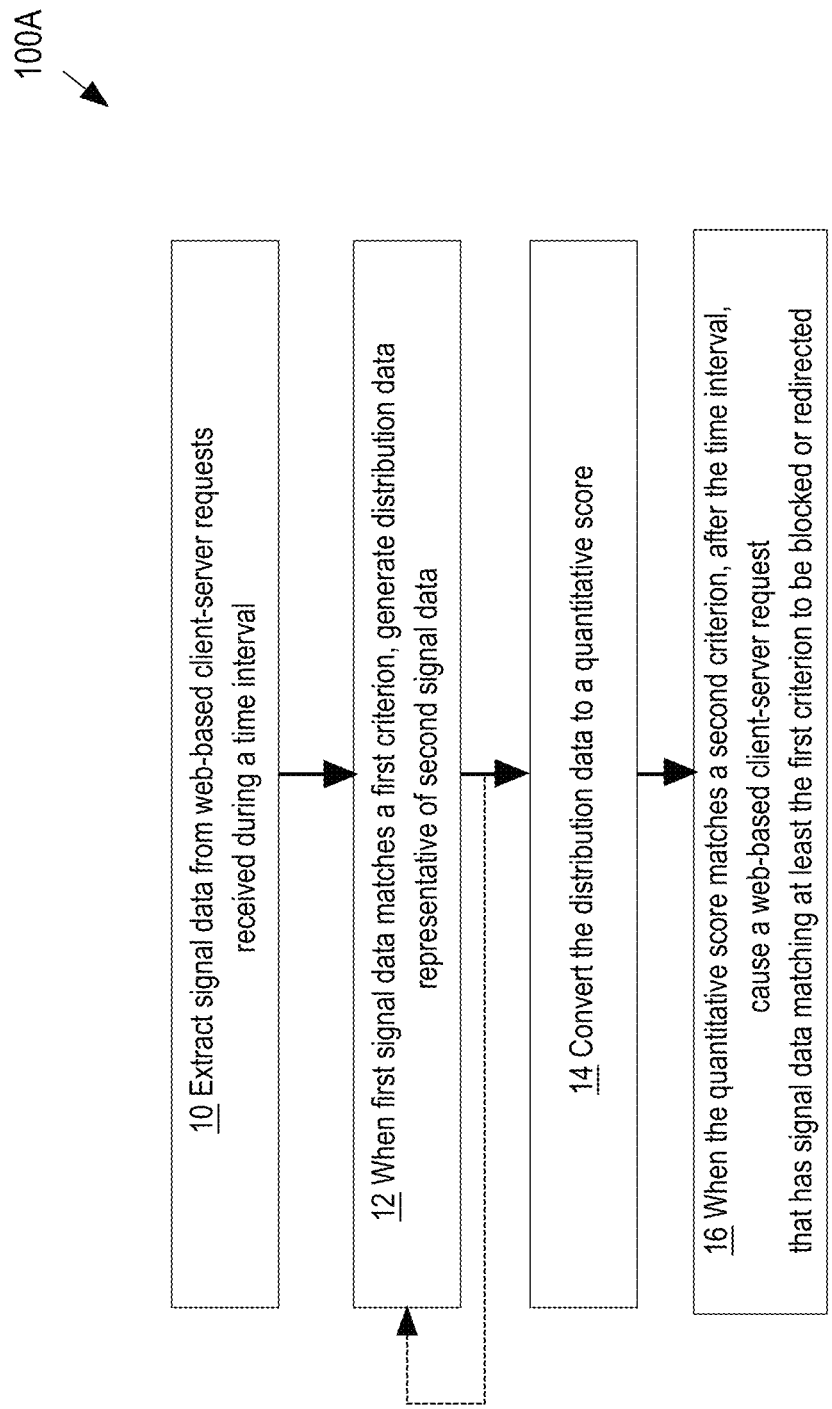
FIG. 1A is a flow diagram of a process, in an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

GENERAL OVERVIEW

Abusive bot activity on a network may be detected in several ways. One of the ways to detect abusive bot activity is to monitor abnormal traffic patterns of HyperText Transfer Protocol (HTTP) requests, such as sudden traffic increases. Another way to detect abusive bot activity is to monitor the request number per field, such as the number of requests per Internet Protocol (IP) address. Engaging humans to perform such monitoring is not feasible for a number of reasons.

First, a bot attack can be launched at any time or hour of the day on any web site from any computing device. This necessitates worldwide round the clock monitoring and incident response. Moreover, bot attackers continuously respond to detection by changing their methods. Consequently, abusive bot detection techniques must continuously adapt to changes in the attackers' approaches.

Machine learning approaches for bot detection have been explored. To have the best performance, supervised machine learning with labels that correctly identify requests that are made by bots has been attempted. However, for certain abuse attacks like scraping, correctly labeling all requests is just not possible. The current tradeoff is to force all requests to execute JavasScript to label only basic bots. Also, machine learning systems need to be trained on large amounts of data in order to reliably detect bot features with the matching label. Thus, a machine learning model often takes many hours or even days to learn to detect new attacks. Such a slow response time for adapting to new attacks with only limited bot detection capability is not sufficient.

This disclosure describes technologies for detecting abusive bot activity on a network by statistically analyzing temporal patterns of occurrences of header fields contained in web-based client-server requests. The disclosed technologies recognize differences between bot requests and human requests by analyzing distributions of header fields within a given time interval. As used herein web-based client-server requests, or simply requests, include but are not limited to HTTP requests. As used herein, header field may refer to a parameter name, and field data may refer to a particular instance of a data value associated with the parameter name in a particular request header. Value as used herein may refer to an alphanumeric or alphabetical or numerical value or a set of alphanumeric or alphabetical or numerical values.

In an approach, the disclosed technologies do not rely on machine learning and do not need to collect and store training data. The disclosed technologies can be used alone or in combination with machine learning and/or other techniques. In one approach, the disclosed technologies broadly recognize signal distributions that are highly indicative of abusive bot behavior. As used herein a signal distribution may refer to a pattern of request header data collected over a time interval or a temporal sequence of discrete time intervals.

In one approach, the disclosed technologies create distributions of occurrences of primary and secondary header fields that are detected in sets of request data received over discrete time intervals. A set of request data corresponds to a particular time interval. Any header field or combination of header fields may be referred to herein as a signal. The disclosed technologies analyze shapes of signal distributions for indications of abusive bot activity. In an approach, the analysis includes computing count ratios for adjacent header field values and comparing one or more of the count ratios to one or more threshold values.

When a count ratio or pattern of count ratios matches a corresponding threshold value, the disclosed technologies convert the signal distribution data to a quantitative score. The disclosed technologies use equations that are configured to compute the quantitative score to be reliably indicative of abusive bot activity if the score exceeds a threshold value. When a quantitative score exceeds its applicable threshold value, the disclosed technologies can cause one or more future web-based client-server requests to be blocked or redirected; thereby thwarting the bot attack.

Experimental results have shown that the disclosed approach has 95% precision with 70% recall on an existing bot signal label. The disclosed approach demonstrates high accuracy on predicting bot signals while maintaining the computation efficiency. It takes the disclosed approach less than one hour to recognize new abusive bot activity, which is a fraction of the time needed by known machine learning techniques to complete the same task. The reductions in processing time that can be realized by the disclosed technologies can free up computing resources for use on other tasks.

Additionally, because the disclosed technologies use signal distributions, which count the number of occurrences of particular signals that are detected within discrete time intervals, the disclosed technologies can detect patterns of abusive bot activity without needing to analyze the actual content of the data values that are part of the signals. Thus, the disclosed technologies can be used even in situations in which it is desirable or necessary to protect the data values contained in the signals from unauthorized access, in order to comply with privacy, confidentiality, or network security restrictions, for example.

Moreover, because the disclosed technologies operate independently of the actual signal data values, the disclosed technologies can be considered language-independent, and as such can be used to monitor request data that is multilingual or encrypted.

Further, the manner in which the disclosed technologies are configured to recognize shapes of signal distributions that are highly likely to correspond to abusive bot behavior enables these technologies to detect activity either at the onset of a bot attack or after abusive bot activity has occurred but gone undetected for a period of time.

Additionally, because the disclosed technologies do not use machine learning models that need to be trained, they can recognize JavaScript-executing bots and other types of advanced bots that machine learning systems are currently unable to detect.

The disclosed technologies are not limited to the above advantages. Other advantages may be realized by any one or more embodiments of the disclosed technologies.

Bot Detection Process Overview

FIG. 1A is a flow diagram that depicts a process 100A that can be used by an online system to detect and block or redirect abusive bot requests, in an embodiment. Portions of process 100A may be performed by a single entity or program or by multiple entities or programs, including for example a browser plug-in and a remote server. The operations of the process as shown in FIG. 1A can be implemented using processor-executable instructions that are stored in computer memory. For purposes of providing a clear example, the operations of FIG. 1A are described as performed by computing device(s) 110, 140, which may be individually or collectively referred to as simply 'computing system 100.' In an embodiment, process 100A may be implemented in signal distribution score computation software 48, which may be embodied in a stream processing service 160 and/or an inference engine 150 communicating with a network perimeter security service 102 and/or an online service 106 and/or a web interface 130, 132, which components are described below with reference to FIG. 1C.

In operation 10, computing system 100 extracts signal data from web-based client-server requests received by an online service during a set of discrete time intervals. A web-based client server request, or request, may be, for example, a communication from a web browser to a server computer, where the communication contains instructions and/or parameters that the server uses to retrieve data for display in the web browser on a client device.

Signal data includes field data associated with one or more header fields contained in a message header of a request. A message header is a portion of a network packet that contains metadata. An HTTP request header is an example of a message header. In an embodiment, an automated event-driven message logging service collects sets of signal data in discrete time increments, such as 30 minutes, 1 hour, 2 hours, etc., and writes the signal data collected over each of the discrete time intervals to one or more log files. In an embodiment, signal data is extracted from the log file(s) using search query(ies) written in, for example, Structured Query Language (SQL). In another embodiment, a stream processing service such as service 160 is to aggregate the request number for each signal in server memory, thereby providing an automated nearline system.

Operation 12 monitors requests received over the set of time intervals, and counts occurrences of primary signals received during those time intervals. An example of a primary signal is a user agent value. In an embodiment, a user agent value identifies an agent, such as a software agent, that is acting on behalf of a user. Examples of user agents include web browsers, email readers and client software.

In an embodiment, operation 12 counts the number of requests received in a given time interval that all have the same user agent. Thus, for each user agent that sends requests during a particular time interval, operation 12 counts the number of requests received from that user agent during the time interval.

Operation 12 collects a set of primary signals that could be bot signal candidates. To ensure that limited computational resources are used to calculate signal distribution scores of primary signals that could potentially causing significant enough damage, the first criterion applied here is used to collect primary signals when the request number exceeds a certain threshold. In an embodiment, the first criterion is implemented using a rule such as: "number of requests having the same primary signal exceeds T1," where a primary signal is a header field value, and T1 is a threshold data value. In one embodiment, a primary signal is user agent value and T1 is N, where N is a positive integer, such that if more than N requests all having the same user agent value are received in a time interval, operation 12 proceeds to generate distribution data that is representative of secondary signals, and analyze the distribution data to determine whether the pattern of requests indicates abusive bot activity.

Thus, in an embodiment, the distribution data of operation 12 is not generated until a sufficient number of occurrences of primary signals matching first criterion have been detected. Also, in an embodiment, the test of whether the primary signal matches the first criterion refers to a count of occurrences matching the first criterion, and does not refer to an evaluation of the potential riskiness of the primary signal value itself. For example, irrespective of whether a user agent is from a known or suspected bad actor, if the occurrence count matches the count threshold, operation 12 proceeds to generate the distribution data for the secondary signals.

In comparing primary signals to the first criterion, operation 12 creates a subset of the signal data that was extracted from requests in operation 10, where the subset includes header data for requests in which the primary signal matches the first criterion. Match as used herein may refer to data being equal to or within a range of values considered acceptable by a given criterion. For example, 100 occurrences of the same user agent is considered matching a criterion if the criterion specifies a minimum value that is less than or equal to 100.

The subset of signal data created by operation 12 contains only the signal data for which the primary signal matches the first criterion. Thus, in an embodiment, the subset that is used to generate a particular set of distribution data includes only requests that all have the same user agent and excludes other requests that have other user agents. Distribution data for those other requests of other user agents can also be generated, separately. In an embodiment, an SQL query containing the first criterion is used to create the subset of signal data that is used to generate the distribution data. In another embodiment, a stream process service is used to aggregate each primary signal's (i) total request number and (ii) request number of the secondary signals, concurrently, in operation 10.

When the primary signal matches the first criterion, operation 12 proceeds to analyze secondary signals contained in this subset.

The type of secondary signal is another header field, which is different from the type of the primary signal. An example of a type of secondary signal is Accept-Language. In an embodiment, Accept Language refers to a request header that identifies one or more languages that the software client is able to understand, and which locale variant is preferred, where languages refers to natural languages, such as English, and not programming languages.

Operation 12 generates distribution data that is representative of the secondary signals. The distribution data generated by operation 12 includes counts of occurrences of the secondary signal for each of the time intervals in the set of time intervals over which requests were received per operation 10. Examples of secondary signal distribution data generated for one user agent value (primary signal) are shown in Tables 1A, 1B, and 1C below. Each of the distributions of Tables 1A, 1B, 1C indicates occurrence counts of secondary signals received over one time interval (one hour, for example).

TABLE 1A

Example of secondary signal distribution data (non-abusive).

| | Occurrence Count | | | |
|---|---|---|---|---|
| Secondary Signal | 1000+ | 500-1000 | 200-500 | 1-200 |
| en-US | X | | | |
| zh-CN | | X | | |
| fr-FR | | | X | |
| es-ES | | | | X |

TABLE 1B

Example of secondary signal distribution data (abusive).

| | Occurrence Count | | | |
|---|---|---|---|---|
| Secondary Signal | 1000+ | 500-1000 | 100-500 | 0-100 |
| en-US | X | | | |
| zh-CN | | | | X |
| fr-FR | | | | X |
| es-ES | | | | X |

TABLE 1C

Example of secondary signal distribution data (abusive).

| | Occurrence Count | | | |
|---|---|---|---|---|
| Secondary Signal | 1000+ | 500-1000 | 100-500 | 0-100 |
| en-US | X | | | |
| zh-CN | X | | | |
| fr-FR | X | | | |
| es-ES | X | | | |

Figure 4:
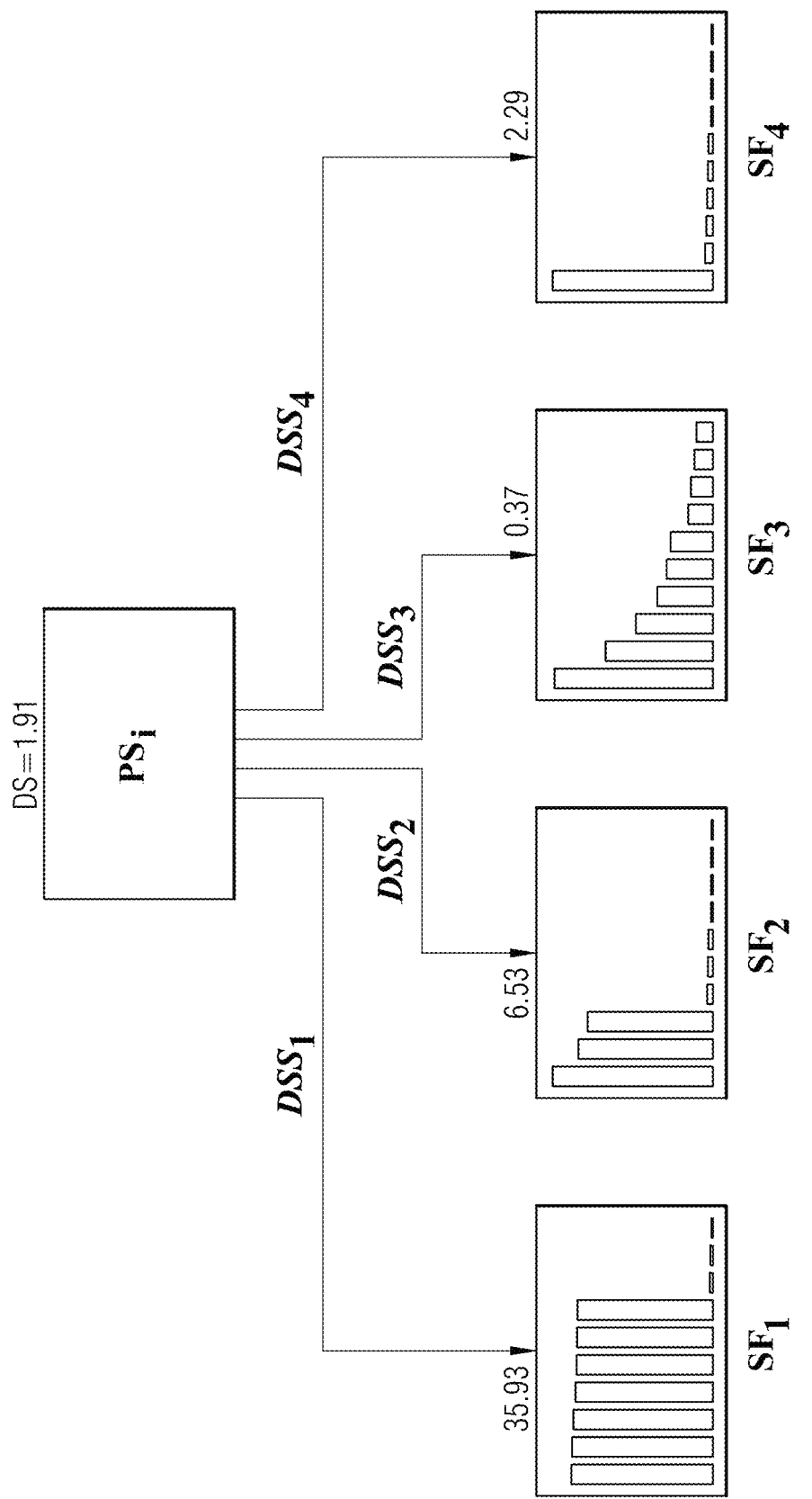
FIG. 4 is a visualization of example signal distribution scores, in an embodiment.

Table 1A illustrates distribution data for a secondary signal type, Accept-Language, that when plotted on a graph has a shape that may correspond to normal human activity. Even though the occurrence count for Accept-Language=en-US may exceed a threshold, this data point in combination with the other data shown in Table 1A may be considered insufficient evidence of an abusive bot. The distribution data shown in Table 1B when plotted on a graph has a shape that more likely may correspond to abusive bot activity rather than normal human activity. Similarly, the distribution data shown in Table 1C when plotted on a graph has a shape that more likely may correspond to abusive bot activity. In some embodiments, as indicated by the dashed line in FIG. 1A, process 100A repeats operation 12 for multiple different secondary signal types. An example in which multiple different secondary signal types are used is shown in FIG. 4, described below.

In operation 14, process 100A converts the distribution data representative of the secondary signals, generated in operation 12, to a quantitative score. The computations used by operation 14 are configured so that there is a significant difference between score values for distribution data that represents normal human online activity and the score values for distribution data that represents abusive bot activity. To do this, operation 14 uses different equations depending on the shape of the secondary signal distribution data.

In an embodiment, operation 14 uses a normal probability equation for secondary signal distributions that do not evidence an abusive primary signal and operation 14 uses an adjusted probability equation for secondary signal distributions that do evidence an abusive primary signal. To determine whether a particular distribution does or does not evidence an abusive primary signal, operation 14 arranges the secondary signals in a descending order of the request count, computes count ratios for pairs of adjacent secondary signals, and compares count ratios of adjacent secondary signals to threshold data values. Additional details of one implementation of operation 14 are described below with reference to FIG. 2.

In operation 16, when the quantitative score matches a second criterion, after the time interval, process 100A causes the matching web-based client-server requests to be blocked or redirected. In an embodiment, operation 16 considers the quantitative score to indicate abusive bot activity requiring remedial action if the score exceeds a threshold value. Operation 16 considers the quantitative score to indicate normal human activity or bot activity that is not considered abusive (and therefore no remedial action is needed), if the score is below the threshold value. In an embodiment, operation 16 sends streaming messages when any abusive bot signal is detected to an inference engine to block and redirect the requests that match the detected abusive bot signal. In another embodiment, operation 16 uses email alerting software to generate and transmit electronic alerts to designated administrators or systems or processes when abusive bot activity is detected.

In some embodiments, operation 16 considers the volume of requests associated with the abusive activity in determining whether or when to send a message containing detected bot signal data. In one implementation, if the number of occurrences of a primary signal (for example a user agent value) counted in a given time interval exceeds a first threshold, lost count threshold ($L_{th}$), (where $L_{th}$ is a positive integer) and the quantitative distribution score exceeds a second threshold, distribution score threshold ($DS_{th}$), where $DS_{th}$ is a positive integer, then operation 16 generates a message to cause blocking or redirecting of the abusive signal.

Example Arrangement of Software Components for Bot Detection

Figure 1B:
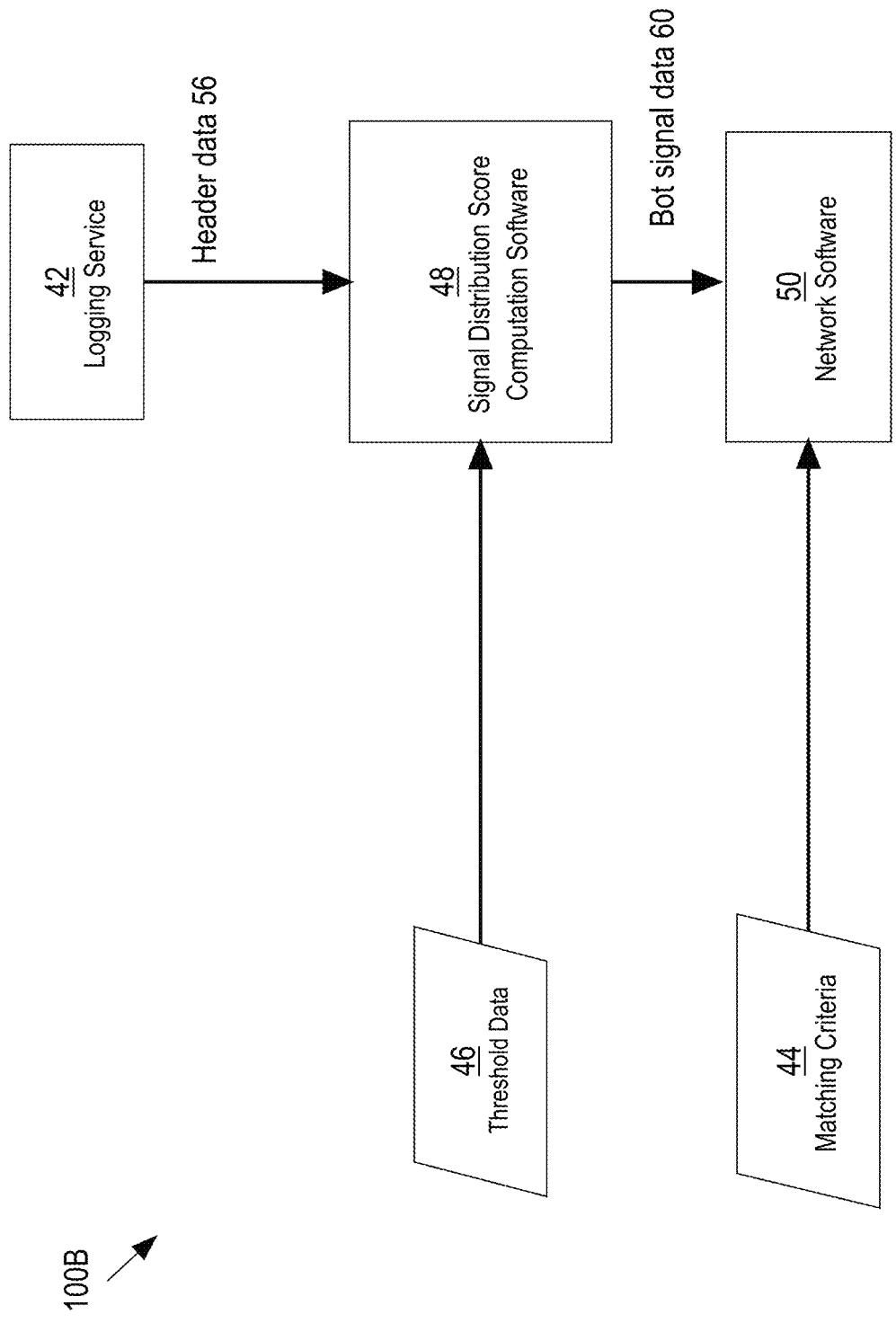
FIG. 1B is a block diagram of a software-based system, in an embodiment.

FIG. 1B is a block diagram that depicts an example system 100B for detecting abusive bot activity on a network based on quantitative scores, in an embodiment. The software-based components of the system of FIG. 1B include logging service 42, score computation software 48, network software 50, matching criteria 44, and threshold data 46.

Logging service 42 is software that logs web-based client-server requests and produces header data 56. The functions of logging service 42 can be performed by network perimeter security service 102 and/or stream processing service 160, both of which are described below with reference to FIG. 1C. In an embodiment, logging service 42 performs a truncation function and a repartition function for each request message. The truncation function extracts from the message header the data that is needed for distribution score computation; for example, header fields. The repartition function pre-processes each message as needed depending on the number of header fields that re used to determine the distribution score.

Logging service 42 outputs the truncated and repartitioned header data 56 for processing by signal distribution score computation software 48. In an embodiment, header data 56 is extracted using SAMZA (open-source software for near-realtime, asynchronous stream processing, provided by the Apache Software Foundation). In an embodiment, header data 56 is output as an intermediate queueing message using KAFKA (open-source software for building real-time data pipelines, provided by the Apache Software Foundation). Other software products providing similar or equivalent functionality as the software products mentioned in this disclosure are used in other embodiments.

Score computation software 48 is logically interposed between logging service 42 and network software 50. Portions of score computation software may be implemented in stream processing service 160 and/or inference engine 150 of FIG. 1C, described below. In an embodiment, score computation software 48 computes the quantitative distribution scores using the processes of FIG. 1A, described above, and FIG. 2, described below. In an embodiment, request counts and corresponding header fields are obtained, corresponding distribution scores are computed, and bot signal data 60 are determined using KAFKA messages. In an embodiment, score computation software 48 uses SAMZA jobs to compute the quantitative scores and incorporate threshold data 46 to determine bot signal data 60.

Threshold data 46 identifies threshold values used by software 48 to determine whether a signal distribution may indicate abusive bot activity. For example, threshold data 46 may identify 100 requests as the corresponding threshold to be used by software to determine whether to generate and analyze secondary signal distributions. Threshold data 46 may identify certain score threshold to determine whether particular quantitative scores indicate abusive bot activity.

Matching criteria 44 indicates the logic to match header field(s) of each incoming web-based client server request with the bot signal data 60. Matching criteria is configured according to the requirements of a particular design or implementation of the system.

Signal distribution score computation software 48 outputs bot signal data 60. Network software 50 incorporate matching criteria 44 with bot signal data 60 to cause the network to take action (for example to block or redirect requests) on one or more subsequent web-based client server requests. Network software 50 may be implemented as part of network perimeter security service 102 of FIG. 1C, described below.

Example Networked System Environment

Figure 1C:
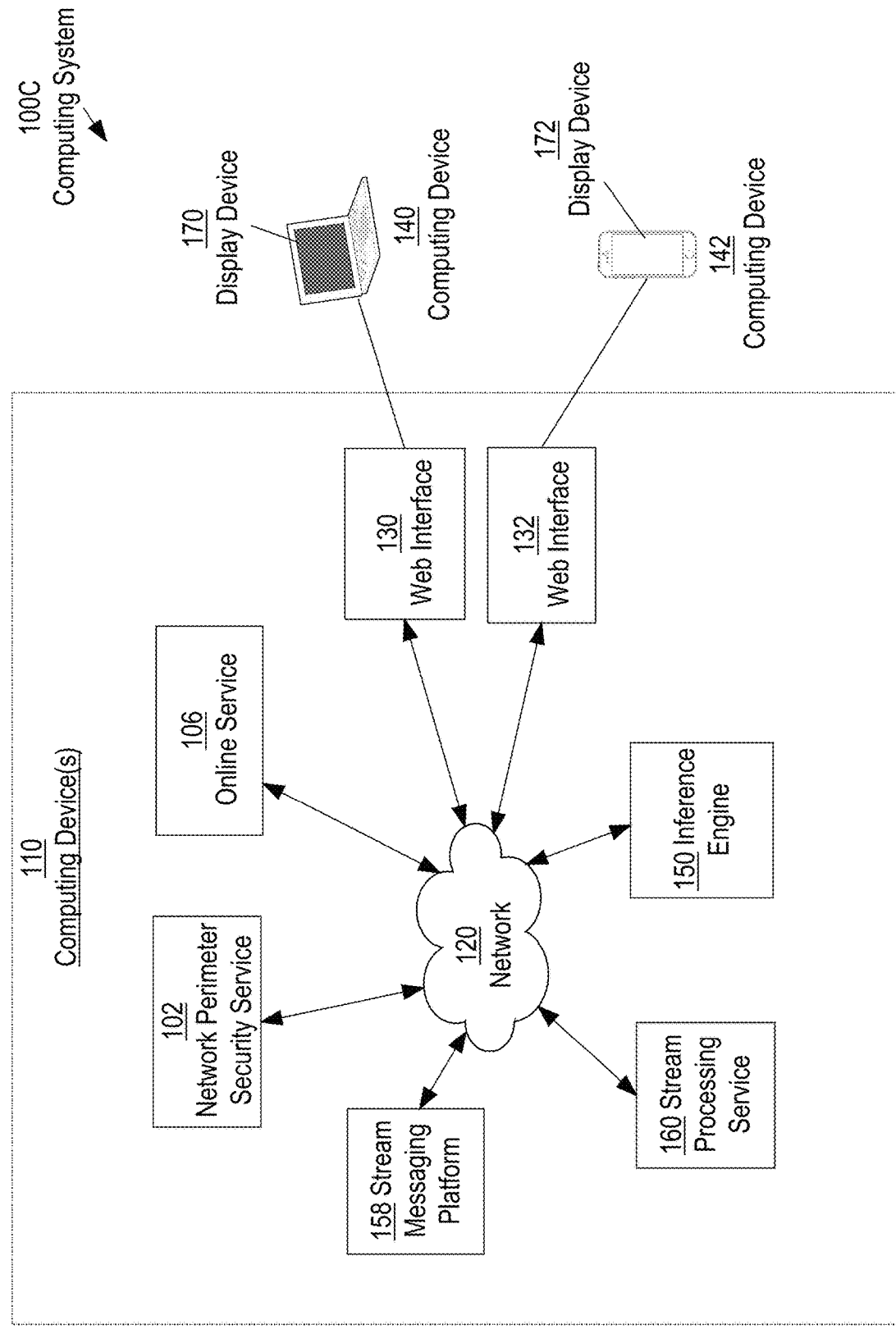
FIG. 1C is a block diagram of a networked computing environment, in an embodiment.

FIG. 1C is a block diagram that depicts an example computing system 100 arranged to operate an inference engine 150, a stream messaging platform 158, a stream processing service 160, web interfaces 130, 132, and to leverage information obtained from an online service 106 and a network perimeter security service 102, in an embodiment. Computing system 100 includes computing device(s) 110, computing devices 140, 142, and display devices 170, 172, which are communicatively coupled to an electronic communications network 120.

Implemented in the devices 110, 140, 142, 170, 172 using computer software, hardware, or software and hardware, are processor-executable instructions, data structures, and digital data, stored in memory, which cooperate to provide the computer-implemented functionality described herein. For ease of discussion, these computer-implemented components are represented schematically in FIG. 1C as network perimeter security service 102, online service 106, web interface 130, web interface 132, inference engine 150, stream messaging platform 158, stream processing service 160.

"System" as used herein may refer to a single computer or network of computers and/or other devices. "Computing device" as used herein may refer to a computer or any other electronic device that is equipped with a processor. Although computing system 100 may be implemented with any number of network perimeter security service 102, online service 106, web interface 130, web interface 132, inference engine 150, stream messaging platform 158, stream processing service 160, computing device(s) 110, display devices 170, 172 and computing devices 140, 142, respectively, in this disclosure, these elements may be referred to in the singular form for ease of discussion.

Network perimeter security service 102, online service 106, web interface 130, web interface 132, inference engine 150, stream messaging platform 158, stream processing service 160 are shown as separate elements in FIG. 1C for ease of discussion but the illustration is not meant to imply that separation of these elements is required. The illustrated systems (or their functionality) and data stores may be divided over any number of physical systems, including a single physical computer system, and can communicate with each other in any appropriate manner.

Web interfaces 130, 132 may be implemented using a Web server computer that communicates with Web browser software running on computing devices 140, 142. Web interfaces 130, 132 enable access to different portions of the functionality of computing system 100, by computing devices 140, 142. For example, web pages containing profile data of online service 106 may be presented to entities via web interfaces 130, 132 using web browser software. Electronic notifications of network drop and/or redirect actions performed by computing system 100 based on detected abusive bot activity may be presented to entities using computing devices 140, 142 via web interfaces 130, 132.

Portions of the illustrative network perimeter security service 102, online service 106, inference engine 150, stream messaging platform 158, and stream processing service 160 may be implemented as web-based software applications and hosted by a hosting service (not shown). For example, web interfaces 130, 132, and portions of online service 106, stream messaging platform 158, stream processing service 160 and inference engine 150 may be implemented as client-side and server-side portions, respectively, of a connection network service such as the LINKEDIN software, which is commercially available from LinkedIn Corporation of Sunnyvale, Calif. In an embodiment, portions of each of web interface 130 and web interface 132 are implemented in a web browser that can execute on computing devices 140, 142, respectively.

In some embodiments, each of computing devices 140, 142 is a client-side computing device or set of cooperating computing devices, such as a smart phone, tablet computer, wearable or body-mounted device, smart appliance, laptop machine, or combination of any of such devices, and computing device 110 is a server-side computing device such as a server computer or network of server computers accessible by the Internet, for example in a public or private cloud. As illustrated in FIG. 1C, each of display devices 170, 172 is implemented in a computing device 140, 142, respectively, but may be implemented as a separate device or as part of another device, or as multiple networked display devices, in other implementations.

The example network perimeter security service 102 manages network traffic, including web-based client-server requests, between the public Internet and a network-based service such as online service 106.

Stream processing service 160 processes the real-time or near-realtime feeds of web-based client-server request messages that it receives via network perimeter security service 102. In an embodiment, stream processing service 160 perform portions of the operations of process 100A and process 200.

After extracting header data from request messages, stream processing service 160 produces header data 56, including primary and secondary signals, on stream messaging platform 158. In an embodiment, stream messaging platform 158 is a message storage platform that can allow various services to produce (write) messages and consume (read) messages.

Header data 56 stored in stream messing platform 158 are consumed (read) by stream processing service 160 to compute quantitative scores. The scores determine the bot signal data 60 which is the output that is also stored in stream messing platform 158, in an embodiment.

Inference engine 150 cooperates with network perimeter security service 102 to consumes (read) bot signal data 60 from stream messaging platform 158 to block or redirect web-based client server requests. Inference engine 150 uses a rule language that implements matching criteria 44, in an embodiment.

Online service 106 is a computer-implemented networking service for entities, such as a professional networking service or an online social network. Online service 106 contains nodes that represent the entities using the online service 106. Data associated with nodes and connections between nodes are represented using a connection graph. In the context of online service 106, "node" may refer to a software abstraction of entity data and need not be tied to any particular hardware or machine that is connected to network 120.

Some implementations of online service 106 allow entities (via users operating electronic devices) to register with online service 106 (thereby creating a node on online service 106), create entity data (for example, profile data), establish connections with other registered entities, and perform other actions, such as message other entities, post articles, view postings from other entities, comment on postings, "like" postings, endorse other entities or established connections, etc. An entity profile may include, for example, a name of the entity, a job title, a job industry, academic institutions attended, employment status, previous and current employers, skills, endorsements from other entities, contact information, address information.

Network 120 may be implemented on any medium or mechanism that provides for the exchange of data between the devices that are connected to the network. Examples of network 120 include, without limitation, a network such as a Local Area Network (LAN), Wide Area Network (WAN), Ethernet or the Internet, or one or more terrestrial, satellite or wireless links. Network 120 may include a combination of networks, such as a combination of wired and wireless networks, as needed to enable communications between the computing device(s) 110, 140, 142.

Computing devices 140, 142 operate web interfaces 130, 132 to establish logical connection(s) over network 120 with portions of online service 106 and may establish logical connection(s) over network 120 with network perimeter security service 102, inference engine 150, and/or stream processing service 160.

Score Computation Process

Figure 2:
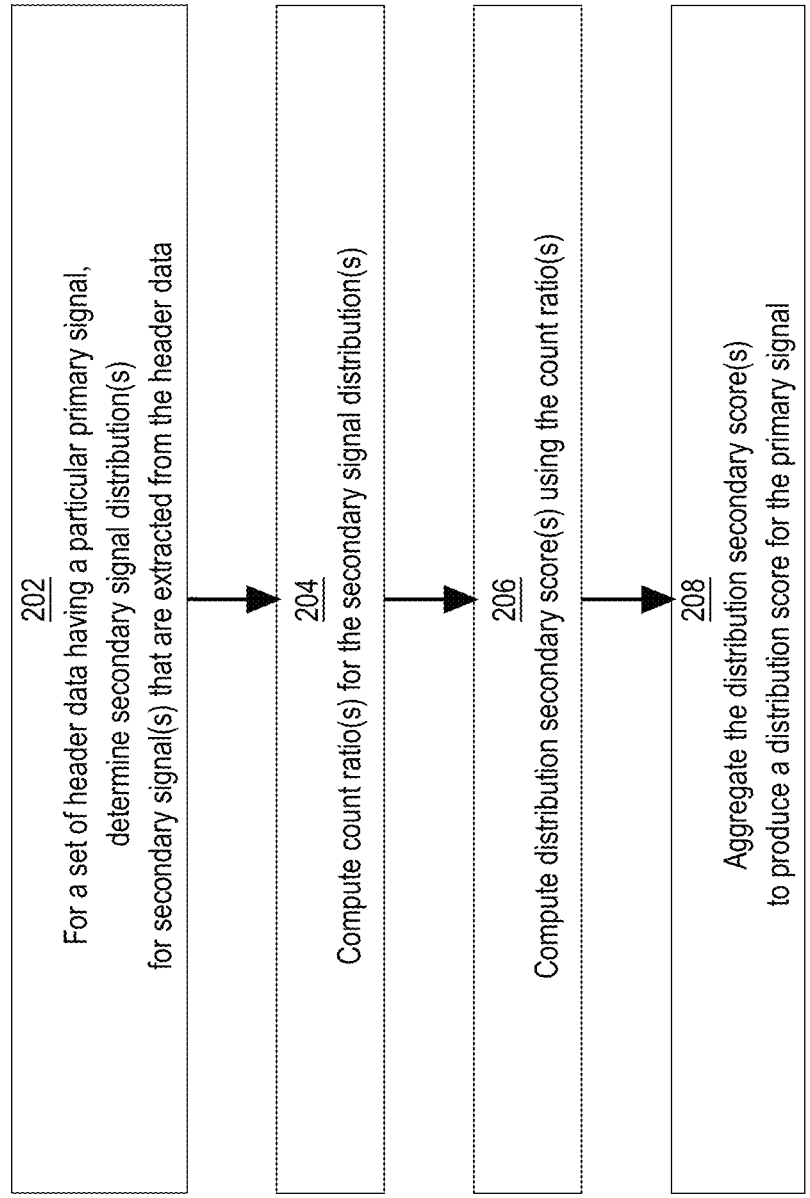
FIG. 2 is a flow diagram of a process, in an embodiment.

FIG. 2 is a flow diagram that depicts a process 200 for computing signal distribution scores, in an embodiment. Process 200 may be performed by a single entity or program or by multiple entities or programs, including for example a browser plug-in and a remote server. The operations of the process as shown in FIG. 2 can be implemented using processor-executable instructions that are stored in computer memory. For purposes of providing a clear example, the operations of FIG. 2 are described as performed by computing device(s) 110, 140, which may be individually or collectively referred to as simply 'computing system 100.'

In an embodiment, process 200 operates on a set of header data that has a particular primary signal. For example, process 200 receives as input the subset of signal data that is generated by operation 12 of FIG. 1A as a result of the comparison of primary signals to first criterion.

In operation 202, process 200 determines secondary signal distribution(s) for each primary signal that are extracted from the header data. Examples of secondary signal distribution(s) are shown in FIGS. 3A, 3B, 3C and FIG. 4, described below.

In operation 204, process 200 computes count ratio(s) for the secondary signal distribution(s) that are determined in operation 202. To do this, operation 204 sorts the secondary signals for a particular signal type (i.e. user agent or Accept-Language) in descending order of the magnitude of the count data and computes count ratios for adjacent pairs of secondary signals. A count ratio reflects the difference in magnitude between the two secondary signals, such that a higher count ratio indicates a larger difference between the two secondary signals and a smaller count ratio indicates a smaller difference between the two secondary signals.

In operation 206, process 200 computes distribution secondary score(s) using the count ratio(s) that are computed by operation 204. In an embodiment, operation 206 includes two subprocesses: distribution classification and distribution score calculation.

Distribution Classification

If a selected primary signal is considered abusive, there are one or several secondary signals that are considered abusive based on their corresponding distributions. Secondary signals that are not considered abusive are labeled as normal secondary signals. A set of requests for a given primary signal may contain both requests from abusive secondary signals and requests from normal secondary signals. Thus, an abusiveness determination for a particular primary signal can be made based on the percentage of total requests that are abusive secondary signals.

Figure 3A:
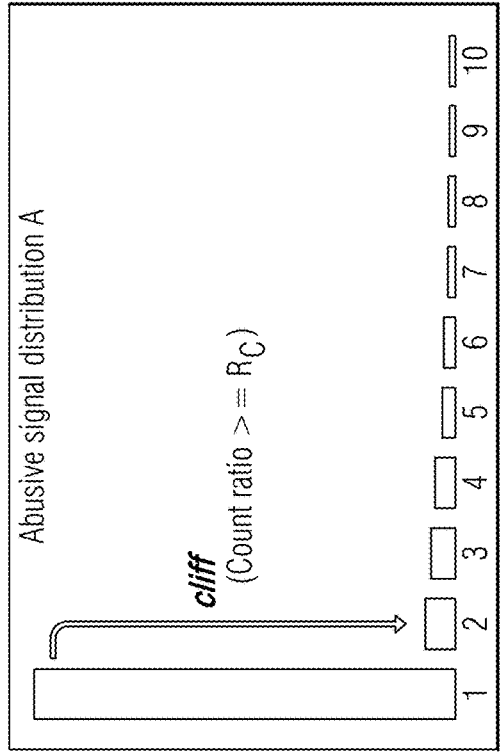
FIG. 3A, FIG. 3B, and FIG. 3C are plots of example signal distributions, in an embodiment.
Figure 3B:
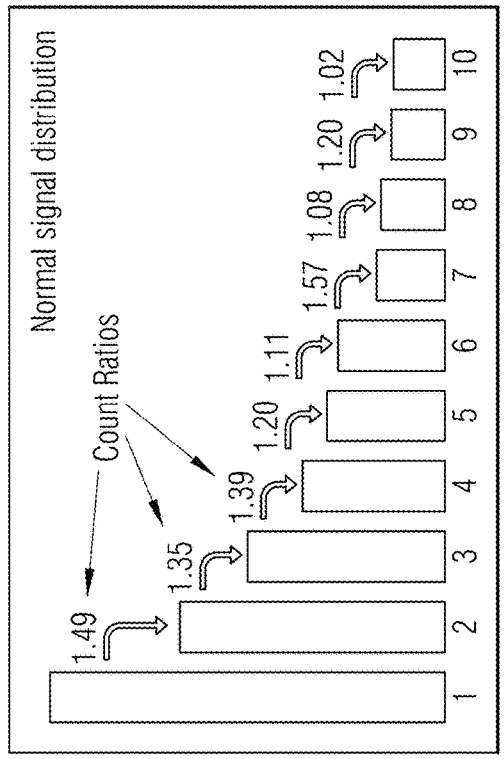
Figure 3C:
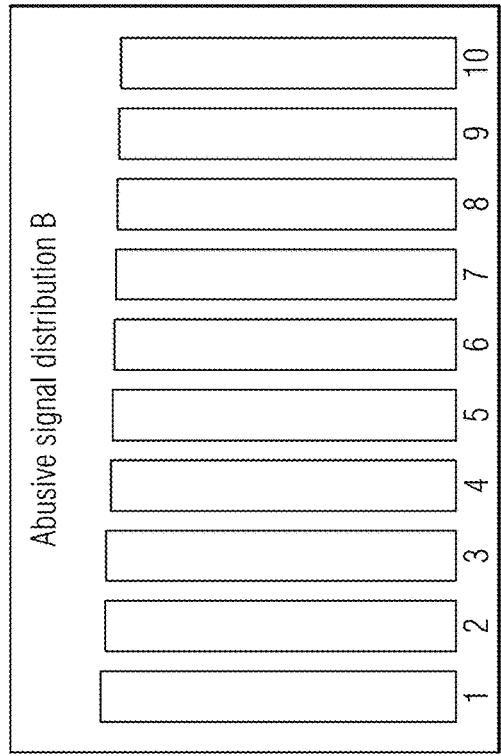

That is, for a primary signal to be considered abusive, abusive secondary signals contribute to the majority of total requests and normal secondary signals occupy a much smaller percentage of the total requests. Thus, the distribution classification step classifies the secondary signal distributions as either normal (non-abusive) or abusive. To distinguish abusive secondary signals and normal secondary signals for any selected primary signal, the count ratios between adjacent secondary signals are compared to threshold data. Specific examples of distribution classifications are shown in FIG. 3A, FIG. 3B, and FIG. 3C, described below.

Distribution Score Calculation

The signal distribution score is composed of one or more distribution secondary scores, depending on the number of secondary signals that are used. In an embodiment, a distribution secondary score (DSS) is a single score for a particular secondary signal, which quantifies the abusiveness of the primary signal based on the particular secondary signal distribution. If multiple secondary signals are used, the signal distribution score for the primary signal is determined by aggregating the DSSs.

Operation 206 uses a probability equation to compute the DSSs. In an embodiment, the general probability equation used to compute DSSs is:

$$DSS = -\sum_{i=1}^{n} \frac{(P_A(x_i))}{\log_2 P_A(x_i)},$$

where i is the index of each secondary signal, n is the number of secondary signals calculated for the distribution, $x_i$ is the number of requests for secondary signal i, $P_A(x_i)$ is the adjusted probability of $x_i$.

In an embodiment, operation 206 uses different equations to compute the numerator in the DSS formula given above, depending upon the distribution classification of the particular secondary signal for which the DSS is begin computed. If a secondary signal distribution does not contain any abusive secondary signals (determined based on an analysis of the count ratios), a normal probability equation is used to determine the DSS. In an embodiment, the normal probability equation is:

$$P_A(x_i) = \frac{x_i}{\sum_{j=1}^{n} x_j},$$

which represents the percentage of total requests containing the normal secondary signal. For distributions that contain abusive secondary signals, an adjusted probability equation is used to determine the DSS. In an embodiment, the adjusted probability equation is:

$$P_A(x_i) = \frac{x_i}{x_1 + \sum_{j=k}^{n} x_j},$$

where k is the index of the first normal secondary signal. Thus, for an abusive distribution, the adjusted probability is based on an adjusted sum where only the leading abusive secondary signal and all normal secondary signals are included.

In operation 208, process 200 aggregates the distribution secondary score(s) computed in operation 206 to produce a distribution score for the primary signal (DS). In an embodiment in which n DSSs are computed (for n different secondary signal distributions), where n is a positive integer, the DS is computed using the following equation:

$$DS = \frac{\sum_{j=1}^{n} \log_2 DSS_i}{n}$$

In the above equation, n is the number of DSSs that are computed in operation 206.

Example Signal Distribution Classifications

FIG. 3A, FIG. 3B, and FIG. 3C are plots of example signal distributions showing request count ratios, in an embodiment, and showing their respective classifications using the disclosed techniques. In an embodiment, the first and second types of request header field are called primary field (PF) and secondary field (SF) respectively. The selected value of a primary field is called the primary signal (PS) as it could be a potential abusive signal. The values of secondary fields are secondary signals (SS).

The distribution in FIG. 3A is a distribution example of normal human-initiated requests. Abusive requests from bots may be evidenced by one or a few secondary signal(s) dominating the majority of requests of the selected primary signal (FIG. 3B, distribution A), or the top several secondary signals all having the almost identical number of requests (FIG. 3C, distribution B). If a distribution similar or identical to either distribution A or distribution B is detected, the selected primary signal can be considered as an abusive signal used by bots and can be blocked or redirected.

FIG. 3A, FIG. 3B, and FIG. 3C show the count ratios that are computed for adjacent secondary signals, where the distributions are arranged in descending order of magnitude. For a normal signal distribution where all secondary signals are normal, count ratios are usually in a range from about 1 to about 3, in an embodiment. An example of a distribution having normal count ratios is shown in FIG. 3A. For an abusive signal distribution such as distribution A (FIG. 3B), a much larger count ratio detects a "cliff" between abusive secondary signals and normal secondary signals. In distribution B (FIG. 3C), there is a sequence of count ratios that are very close to one. The shapes of distributions A and B are characterized by the following criteria, which can be used to detect abusive signal distributions that match or are similar to distribution A and distribution B:

Distribution A: has a count ratio>=cliff ratio ($R_c$).

Distribution B: starts with continuous count ratios <=similar ratio ($R_s$).

In an embodiment, $R_c$ is usually a large number (much larger than the count ratios observed in normal signal distributions. The value of $R_s$ is very close to 1, in an embodiment. For distribution A, the first appearance of count ratio >=Rc is called the cliff. All secondary signals on the left side of the cliff are considered abusive secondary signals. For distribution B, the sequence of secondary signals with request ratios <=Rs are considered abusive secondary signals. Distributions A and B and the discussion thereof are provided for illustration purposes. The disclosed technologies are applicable to other shapes of distributions and these examples do not limit the scope of this disclosure.

Use Case: Guest Scraping Defense

FIG. 4 is a visualization of example signal distributions and corresponding quantitative scores, which may be used to detect guest scraping, in an embodiment. In one guest scraping embodiment, n types of request header fields are used as primary fields and secondary fields where n are positive integers. For a primary signal, $PS_i$ with the selected primary field, there are n−1 secondary signal distributions, from remaining n−1 types of header fields. An overall distribution score (DS) is aggregated from the n secondary signal distribution scores ($DSS_1$ to $DSS_n$) using the formula for DS given above.

In the example of FIG. 4 where 5 types of request header fields are used, $PS_i$ is the selected primary signal, and $SF_1$, $SF_2$, $SF_3$, $SF_4$ are the 4 secondary fields used to obtain secondary signal distributions. Using the formulas given above, the DSSs from the 4 types of secondary signals are computed as: 35.93, 6.53, 0.37, and 2.29 respectively. These DSSs correspond to the shapes of the respective secondary signal distributions. For example, the $SF_3$ distribution may be considered a normal distribution without any abusive signals while the $SF_1$, $SF_2$ and $SF_4$ distributions each have a mix of abusive and normal signals. The DSS for the $SF_1$ distribution is much higher than the other DSSs, reflecting the conclusion of an abusive signal distribution. Aggregating the DSSs results in a DS of 1.91 for the primary signal, $PS_i$.

Implementation Example—Hardware Overview

According to one embodiment, the techniques described herein are implemented by one or more computing devices. For example, portions of the disclosed technologies may be at least temporarily implemented on a network including a combination of one or more server computers and/or other computing devices. The computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such computing devices may also combine custom hard-wired logic, ASICs, or FPGAs with custom programming to accomplish the described techniques.

The computing devices may be server computers, personal computers, or a network of server computers and/or personal computers. Illustrative examples of computers are desktop computer systems, portable computer systems, handheld devices, mobile computing devices, wearable devices, body mounted or implantable devices, smart phones, smart appliances, networking devices, autonomous or semi-autonomous devices such as robots or unmanned ground or aerial vehicles, or any other electronic device that incorporates hard-wired and/or program logic to implement the described techniques.

Figure 5:
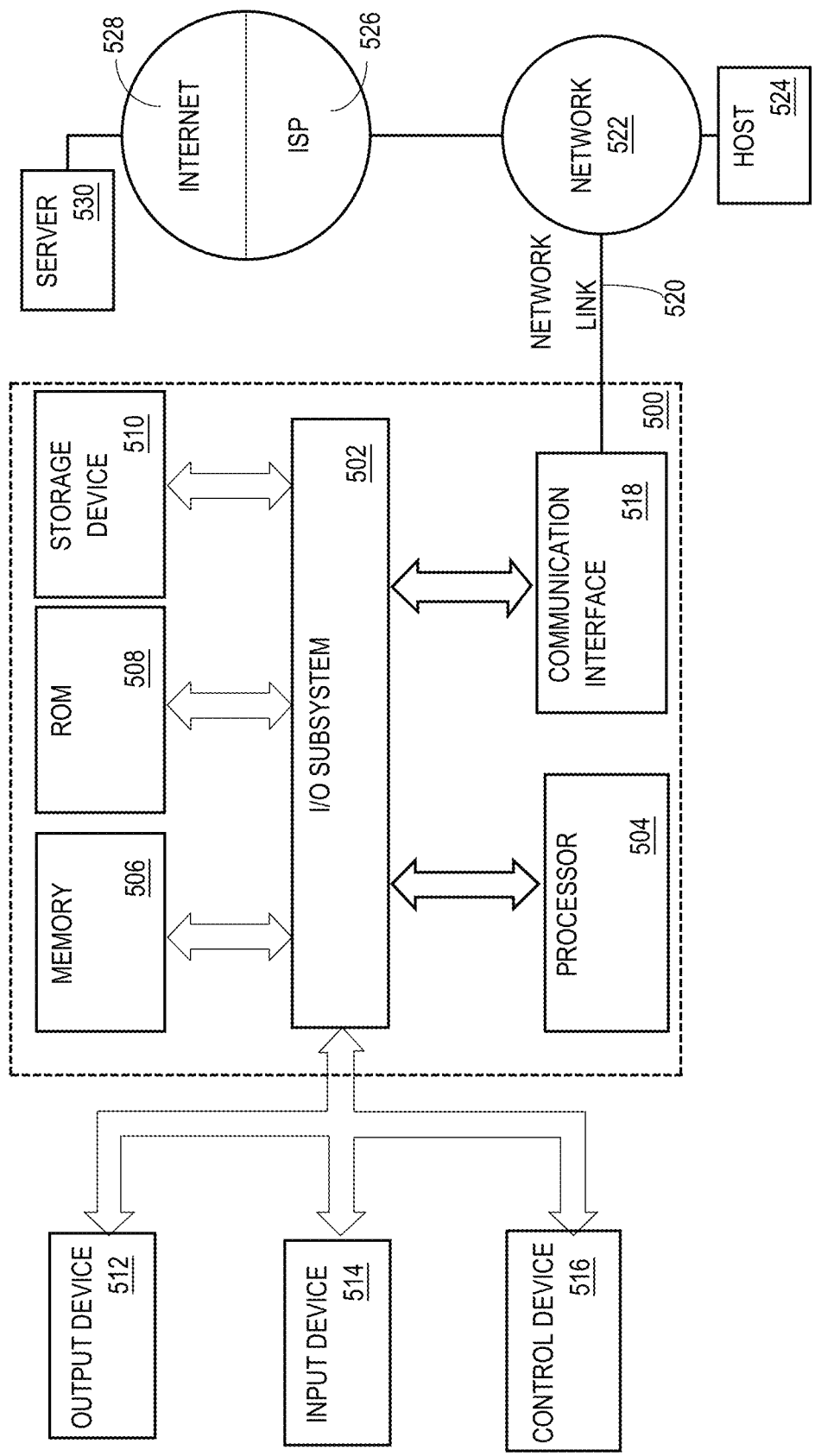
FIG. 5 is a block diagram that illustrates a hardware environment upon which an embodiment of the invention may be implemented.

For example, FIG. 5 is a block diagram that illustrates a computer system 500 upon which an embodiment of the present invention may be implemented. Components of the computer system 500, including instructions for implementing the disclosed technologies in hardware, software, or a combination of hardware and software, are represented schematically in the drawings, for example as boxes and circles.

Computer system 500 includes an input/output (I/O) subsystem 502 which may include a bus and/or other communication mechanism(s) for communicating information and/or instructions between the components of the computer system 500 over electronic signal paths. The I/O subsystem may include an I/O controller, a memory controller and one or more I/O ports. The electronic signal paths are represented schematically in the drawings, for example as lines, unidirectional arrows, or bidirectional arrows.

One or more hardware processors 504 are coupled with I/O subsystem 502 for processing information and instructions. Hardware processor 504 may include, for example, a general-purpose microprocessor or microcontroller and/or a special-purpose microprocessor such as an embedded system or a graphics processing unit (GPU) or a digital signal processor.

Computer system 500 also includes a memory 506 such as a main memory, which is coupled to I/O subsystem 502 for storing information and instructions to be executed by processor 504. Memory 506 may include volatile memory such as various forms of random-access memory (RAM) or other dynamic storage device. Memory 506 also may be used for storing temporary variables or other intermediate information during execution of instructions to be executed by processor 504. Such instructions, when stored in non-transitory computer-readable storage media accessible to processor 504, render computer system 500 into a special-purpose machine that is customized to perform the operations specified in the instructions.

Computer system 500 further includes a non-volatile memory such as read only memory (ROM) 508 or other static storage device coupled to I/O subsystem 502 for storing static information and instructions for processor 504. The ROM 508 may include various forms of programmable ROM (PROM) such as erasable PROM (EPROM) or electrically erasable PROM (EEPROM). A persistent storage device 510 may include various forms of non-volatile RAM (NVRAM), such as flash memory, or solid-state storage, magnetic disk or optical disk, and may be coupled to I/O subsystem 502 for storing information and instructions.

Computer system 500 may be coupled via I/O subsystem 502 to one or more output devices 512 such as a display device. Display 512 may be embodied as, for example, a touch screen display or a light-emitting diode (LED) display or a liquid crystal display (LCD) for displaying information, such as to a computer user. Computer system 500 may include other type(s) of output devices, such as speakers, LED indicators and haptic devices, alternatively or in addition to a display device.

One or more input devices 514 is coupled to I/O subsystem 502 for communicating signals, information and command selections to processor 504. Types of input devices 514 include touch screens, microphones, still and video digital cameras, alphanumeric and other keys, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 516, which may perform cursor control or other automated control functions such as navigation in a graphical interface on a display screen, alternatively or in addition to input functions. Control device 516 may be implemented as a touchpad, a mouse, a trackball, or cursor direction keys for communicating direction information and command selections to processor 504 and for controlling cursor movement on display 512. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 514 may include a combination of multiple different input devices, such as a video camera and a depth sensor.

Computer system 500 may implement the techniques described herein using customized hard-wired logic, one or more ASICs or FPGAs, firmware and/or program logic which in combination with the computer system causes or programs computer system 500 to operate as a special-purpose machine. According to one embodiment, the techniques herein are performed by computer system 500 in response to processor 504 executing one or more sequences of one or more instructions contained in memory 506. Such instructions may be read into memory 506 from another storage medium, such as storage device 510. Execution of the sequences of instructions contained in memory 506 causes processor 504 to perform the process steps described herein. In alternative embodiments, hard-wired circuitry may be used in place of or in combination with software instructions.

The term "storage media" as used in this disclosure refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as memory 506. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 500 can receive the data on the communication link and convert the data to a format that can be read by computer system 500. For instance, a receiver such as a radio frequency antenna or an infrared detector can receive the data carried in a wireless or optical signal and appropriate circuitry can provide the data to I/O subsystem 502 such as place the data on a bus. I/O subsystem 502 carries the data to memory 506, from which processor 504 retrieves and executes the instructions. The instructions received by memory 506 may optionally be stored on storage device 510 either before or after execution by processor 504.

Computer system 500 also includes a communication interface 518 coupled to bus 502. Communication interface 518 provides a two-way data communication coupling to network link(s) 520 that are directly or indirectly connected to one or more communication networks, such as a local network 522 or a public or private cloud on the Internet. For example, communication interface 518 may be an integrated-services digital network (ISDN) card, cable modem, satellite modem, or a modem to provide a data communication connection to a corresponding type of communications line, for example a coaxial cable or a fiber-optic line or a telephone line. As another example, communication interface 518 may include a local area network (LAN) card to provide a data communication connection to a compatible LAN. Wireless links may also be implemented. In any such implementation, communication interface 518 sends and receives electrical, electromagnetic or optical signals over signal paths that carry digital data streams representing various types of information.

Network link 520 typically provides electrical, electromagnetic, or optical data communication directly or through one or more networks to other data devices, using, for example, cellular, Wi-Fi, or BLUETOOTH technology. For example, network link 520 may provide a connection through a local network 522 to a host computer 524 or to other computing devices, such as personal computing devices or Internet of Things (IoT) devices and/or data equipment operated by an Internet Service Provider (ISP) 526. ISP 526 provides data communication services through the world-wide packet data communication network commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data and instructions, including program code, through the network(s), network link 520 and communication interface 518. In the Internet example, a server 530 might transmit a requested code for an application program through Internet 528, ISP 526, local network 522 and communication interface 518. The received code may be executed by processor 504 as it is received, and/or stored in storage device 510, or other non-volatile storage for later execution.

Additional Examples

Illustrative examples of the technologies disclosed herein are provided below. An embodiment of the technologies may include any of the examples described below.

In an example 1, a method includes extracting at least a primary signal and a secondary signal from header data logged by an automated service during a time interval; where the header data is associated with web-based client-server requests received by an online system; generating distribution data representative of the secondary signal when the primary signal matches a first criterion; converting the distribution data to a quantitative score; after the time interval, causing a web-based client-server request to be blocked or redirected when the quantitative score matches a second criterion; where the method is performed by one or more computing devices.

An example 2 includes the subject matter of example 1, where the primary signal includes User-Agent. An example 3 includes the subject matter of example 1 or example 2, where the secondary signal includes any one or more of the following: User-Agent, Accept-Language, other HTTP header fields. An example 4 includes the subject matter of any of examples 1-3, where the primary signal includes any one or more of the following: User-Agent, Accept-Language, other HTTP header fields. An example 5 includes the subject matter of any of examples 1-4, where the first criterion includes a request count threshold that indicates a minimum number of web-based client-server requests that need to be received during the time interval in order to generate the distribution data. An example 6 includes the subject matter of any of examples 1-5, where the second criterion includes a data value that indicates that the web-based client-server request was generated by an abusive bot.

An example 7 includes the subject matter of any of examples 1-6, where: the distribution data includes count data for each of a plurality of different types of secondary signals; the count data for a particular type of secondary signal indicates a number of web-based client-server requests counted during the time interval that include the particular type of secondary signal; and converting the distribution data to a quantitative score includes: ordering the distribution data in a descending order of magnitude of the count data, computing count ratios for adjacent pairs of count data in the ordered distribution data, computing the quantitative score using an equation that is determined based on whether one or more of the count ratios matches a count ratio threshold.

An example 8 includes the subject matter of example 7, and includes computing a first quantitative score when a first subset of the count ratios is greater than or equal to a first count ratio threshold or a second subset of the count ratios is less than or equal to a second count ratio threshold, and computing a second quantitative score when the first subset of the count ratios is less than the first count ratio threshold or the second subset of the count ratios is greater than the second count ratio threshold, where an equation used to compute the first quantitative score is different than an equation used to compute the second quantitative score. An example 9 includes the subject matter of any of examples 1-8, and includes determining a request count that indicates a count of web-based client-server requests received during the time interval that have a primary signal matching the first criterion, and after the time interval, causing the web-based client-server request to be blocked or redirected when the request count matches a request count threshold. An example 10 includes the subject matter of any of examples 1-9, and includes using the quantitative score to block or redirect a web scraping bot request or a JavaScript-executing bot request.

In an example 11, a computer program product includes: one or more non-transitory computer-readable storage media including instructions which, when executed by one or more processors, cause the one or more processors to perform operations including: extracting at least a primary signal and a secondary signal from header data logged by an automated service during a time interval; where the header data is associated with web-based client-server requests received by an online system; generating distribution data representative of the secondary signal when the primary signal matches a first criterion; converting the distribution data to a quantitative score; after the time interval, causing a web-based client-server request to be blocked or redirected when the quantitative score matches a second criterion; where the method is performed by one or more computing devices.

An example 12 includes the subject matter of example 11, where the primary signal includes User-Agent. An example 13 includes the subject matter of example 11 or example 12, where the secondary signal includes any one or more of the following: User-Agent, Accept-Language, other HTTP header fields. An example 14 includes the subject matter of any of examples 11-13, where the primary signal includes any one or more of the following: User-Agent, Accept-Language, other HTTP header fields. An example 15 includes the subject matter of any of examples 11-14, where the first criterion includes a request count threshold that indicates a minimum number of web-based client-server requests that need to be received during the time interval in order to generate the distribution data. An example 16 includes the subject matter of any of examples 11-15, where the second criterion includes a data value that indicates that the web-based client-server request was generated by an abusive bot.

An example 17 includes the subject matter of any of examples 11-16, where: the distribution data includes count data for each of a plurality of different types of secondary signals; the count data for a particular type of secondary signal indicates a number of web-based client-server requests counted during the time interval that include the particular type of secondary signal; and converting the distribution data to a quantitative score includes: ordering the distribution data in a descending order of magnitude of the count data, computing count ratios for adjacent pairs of count data in the ordered distribution data, computing the quantitative score using an equation that is determined based on whether one or more of the count ratios matches a count ratio threshold.

An example 18 includes the subject matter of example 17, where the instructions, when executed by one or more processors, cause the one or more processors to perform operations comprising computing a first quantitative score when a first subset of the count ratios is greater than or equal to a first count ratio threshold or a second subset of the count ratios is less than or equal to a second count ratio threshold, and computing a second quantitative score when the first subset of the count ratios is less than the first count ratio threshold or the second subset of the count ratios is greater than the second count ratio threshold, wherein an equation used to compute the first quantitative score is different than an equation used to compute the second quantitative score. An example 19 includes the subject matter of any of examples 11-18, where the instructions, when executed by one or more processors, cause the one or more processors to perform operations comprising determining a request count that indicates a count of web-based client-server requests received during the time interval that have a primary signal matching the first criterion, and after the time interval, causing the web-based client-server request to be blocked or redirected when the request count matches a request count threshold. An example 20 includes the subject matter of any of examples 11-19, wherein the instructions, when executed by one or more processors, cause the one or more processors to perform operations comprising using the quantitative score to block or redirect a web scraping bot request or a JavaScript-executing bot request.

General Considerations

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Any definitions set forth herein for terms contained in the claims may govern the meaning of such terms as used in the claims. No limitation, element, property, feature, advantage or attribute that is not expressly recited in a claim should limit the scope of the claim in any way. The specification and drawings are to be regarded in an illustrative rather than a restrictive sense.

As used in this disclosure the terms "include" and "comprise" (and variations of those terms, such as "including," "includes," "comprising," "comprises," "comprised" and the like) are intended to be inclusive and are not intended to exclude further features, components, integers or steps.

References in this document to "an embodiment," etc., indicate that the embodiment described or illustrated may include a particular feature, structure, or characteristic, but every embodiment may not necessarily include the particular feature, structure, or characteristic. Such phrases are not necessarily referring to the same embodiment. Further, when a particular feature, structure, or characteristic is described or illustrated in connection with an embodiment, it is believed to be within the knowledge of one skilled in the art to effect such feature, structure, or characteristic in connection with other embodiments whether or not explicitly indicated.

Various features of the disclosure have been described using process steps. The functionality/processing of a given process step could potentially be performed in different ways and by different systems or system modules. Furthermore, a given process step could be divided into multiple steps and/or multiple steps could be combined into a single step. Furthermore, the order of the steps can be changed without departing from the scope of the present disclosure.

It will be understood that the embodiments disclosed and defined in this specification extend to alternative combinations of the individual features and components mentioned or evident from the text or drawings. These different combinations constitute various alternative aspects of the embodiments.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
    extracting at least a primary signal and a secondary signal from header data logged by an automated service during a time interval;
    wherein the header data is associated with web-based client-server requests received by an online system;
    generating distribution data representative of the secondary signal when the primary signal matches a first criterion; the distribution data comprises count data for each of a plurality of different types of secondary signals;
    converting the distribution data to a quantitative score;
    wherein converting the distribution data to a quantitative score comprises ordering the distribution data in a descending order of magnitude of the count data, computing count ratios for adjacent pairs of count data in the ordered distribution data;
    computing, as the quantitative score, a first quantitative score when a first subset of the count ratios is greater than or equal to a first count ratio threshold or a second subset of the count ratios is less than or equal to a second count ratio threshold, and computing, as the quantitative score, a second quantitative score when the first subset of the count ratios is less than the first count ratio threshold or the second subset of the count ratios is greater than the second count ratio threshold, wherein an equation used to compute the first quantitative score is different than an equation used to compute the second quantitative score;
    after the time interval, causing a web-based client-server request to be blocked or redirected when the quantitative score matches a second criterion;
    wherein the method is performed by one or more computing devices.

2. The method of claim 1, wherein the primary signal comprises User-Agent.

3. The method of claim 1, wherein the secondary signal comprises any one or more of the following: User-Agent, Accept-Language, other HTTP header fields.

4. The method of claim 1, wherein the primary signal comprises any one or more of the following: User-Agent, Accept-Language, other HTTP header fields.

5. The method of claim 1, wherein the second criterion comprises a data value that indicates that the web-based client-server request was generated by an abusive bot.

6. The method of claim 1, wherein:
    the count data for a particular type of secondary signal indicates a number of web-based client-server requests counted during the time interval that include the particular type of secondary signal converting, to a quantitative score comprises:
        computing the quantitative score using an equation that is determined based on whether one or more of the count ratios matches a count ratio threshold.

7. The method of claim 1, comprising using the quantitative score to block or redirect a web scraping bot request or a JavaScript-executing bot request.

8. A method comprising:
extracting at least a primary signal and a secondary signal from header data logged by an automated service during a time interval;
wherein the header data is associated with web-based client-server requests received by an online system;
generating distribution data representative of the secondary signal when the primary signal matches a first criterion;
wherein the first criterion comprises a request count threshold that indicates a minimum number of web-based client-server requests that need to be received during the time interval in order to generate the distribution data;
converting the distribution data to a quantitative score;
determining a request count that indicates a count of web-based client-server requests received during the time interval that have a primary signal matching the first criterion, and after the time interval, causing at least one web-based client-server request to be blocked or redirected when the request count matches the request count threshold;
wherein the method is performed by one or more computing devices.

9. A computer program product comprising:
one or more non-transitory computer-readable storage media comprising instructions which, when executed by one or more processors, cause the one or more processors to perform operations comprising:
extracting at least a primary signal and a secondary signal from header data logged by an automated service during a time interval;
wherein the header data is associated with web-based client-server requests received by an online system;
generating distribution data representative of the secondary signal when the primary signal matches a first criterion;
wherein the first criterion comprises a request count threshold that indicates a minimum number of web-based client-server requests that need to be received during the time interval in order to generate the distribution data;
converting the distribution data to a quantitative score;
determining a request count that indicates a count of web-based client-server requests received during the time interval that have a primary signal matching the first criterion, and after the time interval, causing at least one web-based client-server request to be blocked or redirected when the request count matches the request count threshold or the quantitative score matches a second criterion.

10. The computer program product of claim 9, wherein the primary signal comprises User-Agent.

11. The computer program product of claim 9, wherein the secondary signal comprises any one or more of the following: User-Agent, Accept-Language, other HTTP header fields.

12. The computer program product of claim 9, wherein the primary signal comprises any one or more of the following: User-Agent, Accept-Language, other HTTP header fields.

13. The computer program product of claim 9, wherein the first criterion comprises a request count threshold that indicates a minimum number of web-based client-server requests that need to be received during the time interval in order to generate the distribution data.

14. The computer program product of claim 9, wherein the second criterion comprises a data value that indicates that at least one web-based client-server request was generated by an abusive bot.

15. The computer program product of claim 9, wherein the instructions, when executed by one or more processors, cause the one or more processors to perform operations comprising using the quantitative score to block or redirect a web scraping bot request or a JavaScript-executing bot request.

16. A computer program product comprising:
one or more non-transitory computer-readable storage media comprising instructions which, when executed by one or more processors, cause the one or more processors to perform operations comprising:
extracting at least a primary signal and a secondary signal from header data logged by an automated service during a time interval;
wherein the header data is associated with web-based client-server requests received by an online system;
generating distribution data representative of the secondary signal when the primary signal matches a first criterion; the distribution data comprises count data for each of a plurality of different types of secondary signals;
ordering the distribution data in a descending order of magnitude of the count data,
computing count ratios for adjacent pairs of count data in the ordered distribution data, converting the distribution data to a quantitative score;
computing, as the quantitative score, a first quantitative score when a first subset of the count ratios is greater than or equal to a first count ratio threshold or a second subset of the count ratios is less than or equal to a second count ratio threshold, and computing, as the quantitative score, a second quantitative score when the first subset of the count ratios is less than the first count ratio threshold or the second subset of the count ratios is greater than the second count ratio threshold, wherein an equation used to compute the first quantitative score is different than an equation used to compute the second quantitative score;
after the time interval, causing a web-based client-server request to be blocked or redirected when the quantitative score matches a second criterion.

17. The computer program product of claim 16, wherein:
the count data for a particular type of secondary signal indicates a number of web-based client-server requests counted during the time interval that include the particular type of secondary signal;
converting the distribution data to a quantitative score comprises:
computing the quantitative score using an equation that is determined based on whether one or more of the count ratios matches a count ratio threshold.

* * * * *